Dec. 17, 1935.  H. C. SCOTT  2,024,982
SURGICAL INSTRUMENT
Filed Dec. 19, 1934  3 Sheets-Sheet 2
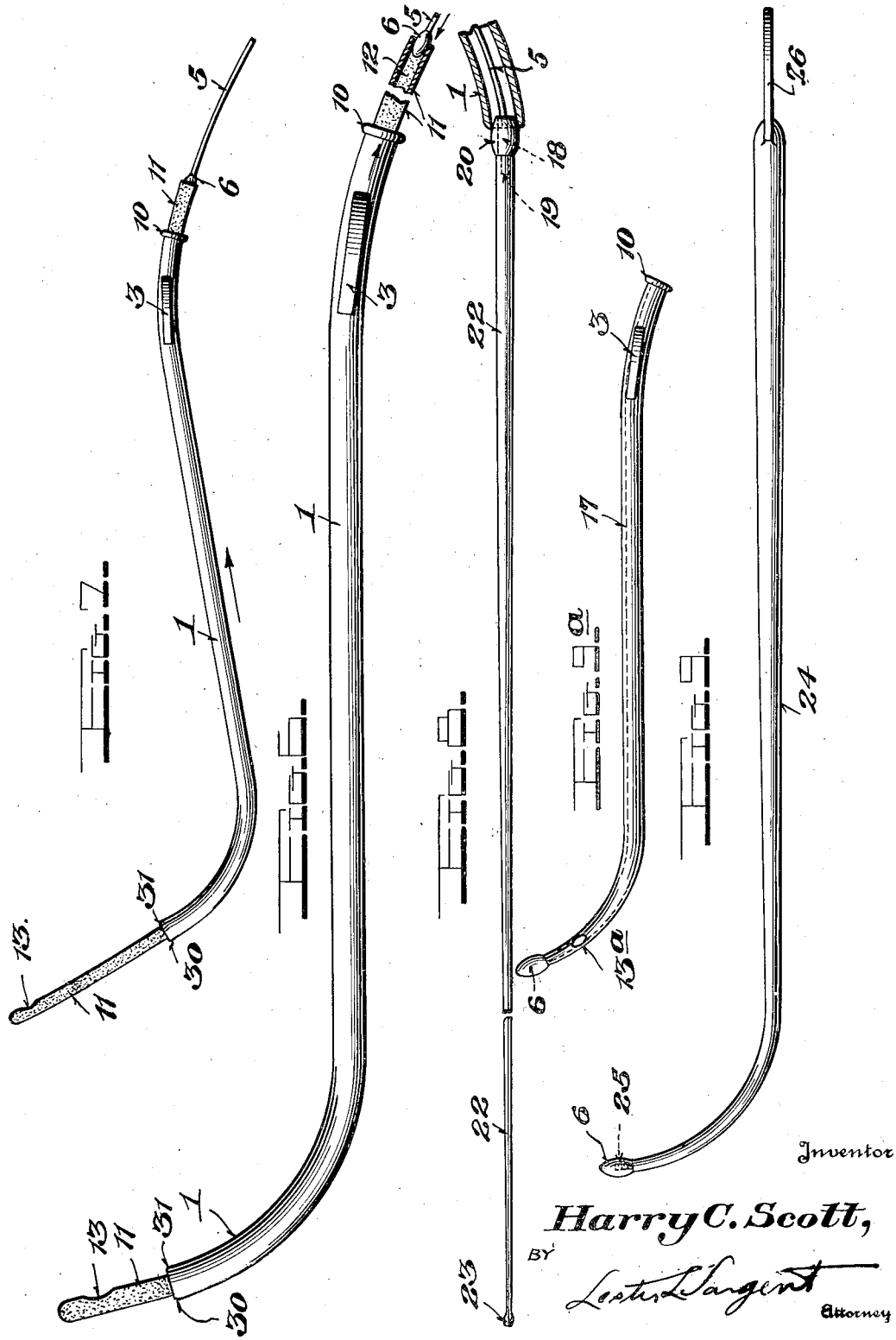

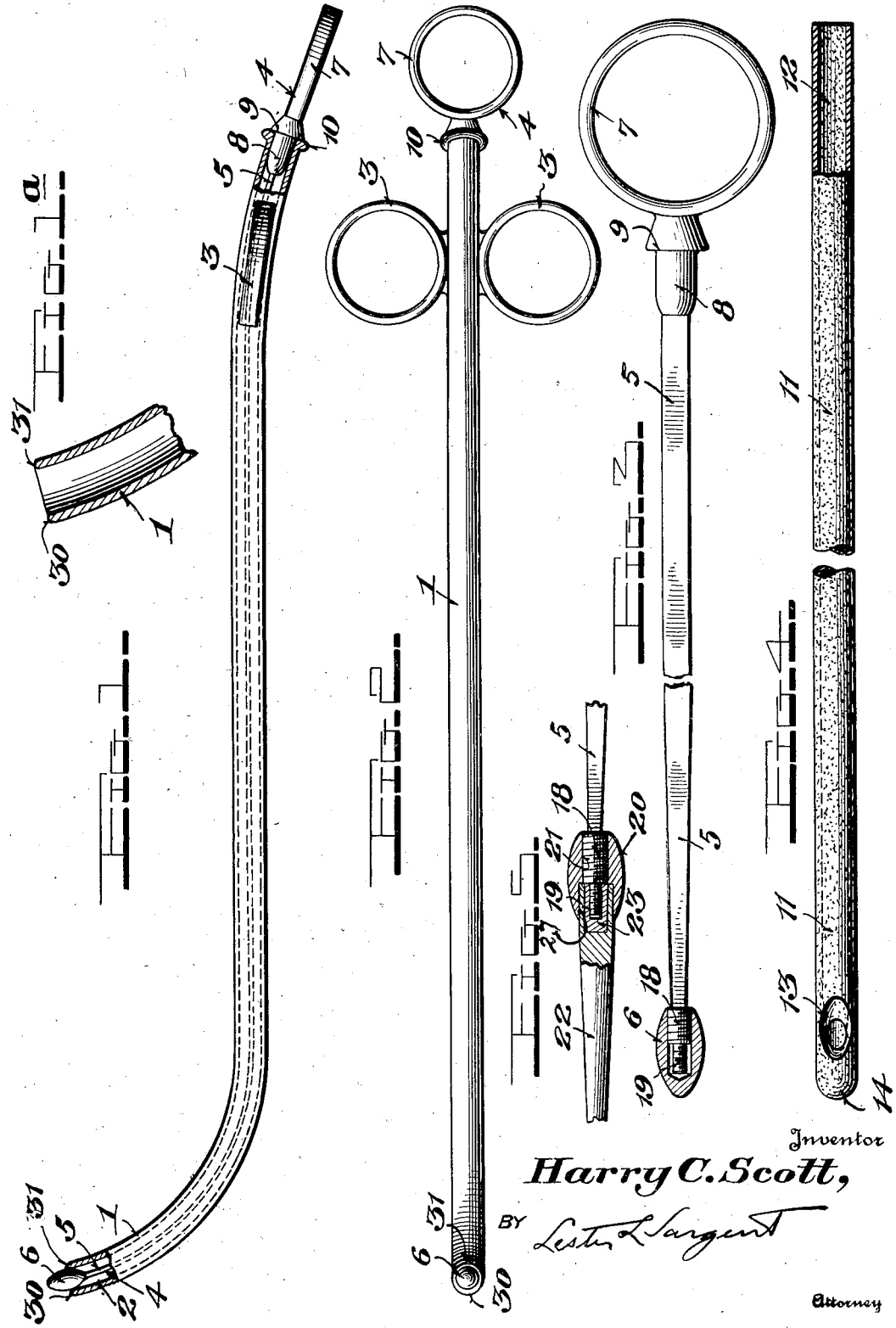

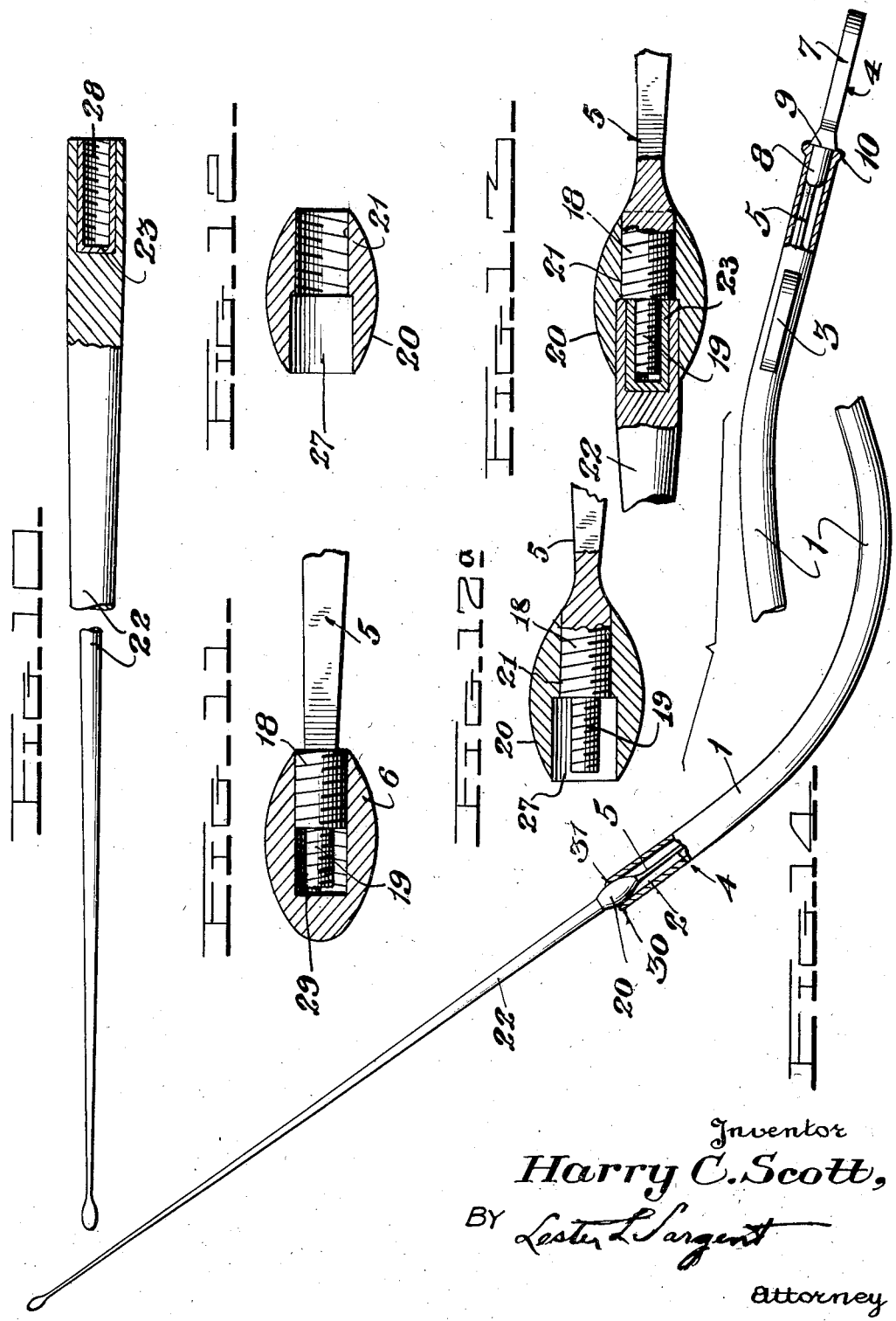

Patented Dec. 17, 1935

2,024,982

UNITED STATES PATENT OFFICE 2,024,982

SURGICAL INSTRUMENT

Harry C. Scott, Waynesburg, Pa.

Application December 19, 1934, Serial No. 758,305

7 Claims. (Cl. 128—349)

The object of my invention is to provide certain improvements in an instrument for use in various surgical operations, and especially as a urethral sound, as a catheter, and as a progressive method of inserting retention male catheter.

It is also an object of my invention to provide the novel combination and arrangement of parts disclosed in the accompanying drawings and hereinafter described. I attain these and other objects of my invention by the device illustrated in the accompanying drawings, in which—

Figure 1 is a side elevation of the sheath with a portion at tip removed and with the obturator in place; the flat stem 5 being shown in edge elevation;

Fig. 1a is an enlarged detail section through the end portion of the sheath;

Fig. 2 is a front plan view of the sheath and obturator;

Fig. 3 is a front plan view of closed obturator tip 6 attached to member 5;

Fig. 4 is a view of the rubber catheter partly in plan and partly in section;

Fig. 5 is a detail view of the novel removable open tip of the obturator which permits of the attachment of the filiform bougie to the novel obturator stem;

Fig. 6 is a side elevation of the sheath I with the rubber catheter 11 inserted therethrough and with the closed tip 6 of the obturator applied to the shank of the catheter 11;

Fig. 7 is a similar view, reduced size, showing the sheath partly withdrawn, the flat stem 5 being shown in edge elevation;

Fig. 8 is a side elevation of the filiform bougie attached to the obturator stem 5 used as a guide;

Fig. 9 is a side elevation of a conventional type of sound with the usual closed obturator tip 6;

Fig. 9a is a side elevation, reduced size, of a conventional type of silver catheter, with closed obturator tip 6;

Fig. 10 is an enlarged view of the filiform bougie showing the novel threaded ferrule 23 mounted in its shank;

Fig. 11 is a detail sectional view of my closed obturator tip 6 showing its threaded chambered portion 29 engaged by threaded portion 18 of stem 5;

Fig. 12 is a longitudinal section through the open obturator tip 20 showing the threaded channel 21; whereby this tip may, when desired, be screwthreaded on member 18 in place of closed obturator tip 6;

Fig. 12a is a longitudinal section through my open obturator tip 20, with threaded portion 21 engaging threaded portion 18 of stem 5;

Fig. 13 is a longitudinal sectional view of my open obturator tip 20 on portion 18 of stem 5, and with the filiform bougie 22 seated in chamber 27 and attached to the reduced threaded end 19 of stem 5; and Fig. 14 is a view, partly in section and partly in elevation, of the sheath, filiform bougie 22, stem 5, and tip 20, the flat stem 5 being shown in edge elevation.

Referring to the accompanying drawings, Figs. 1, 2, 6, 7 and 14, I have devised a sheath I, which may be of silver, or of hard rubber or bakelite or the like, or any combination of metal and hard rubber or the like, in a sheath of appropriate shape as shown to meet anatomical requirements, and which may have its operative end suitably rounded and thickened at the posterior tip. The sheath I has a continuous passage 2 of uniform diameter extending from end to end, and as shown in Fig. 1, has suitable handles 3 on its shank.

I have devised an obturator 4 comprising a preferably flat somewhat flexible stem or stilet bougie 5, and an ellipsoidal tip 6 of appropriate size in the plane of its largest diameter to permit of its insertion through the sheath I so that the major portion of the tip will project slightly beyond the end of the sheath to function as an obturator.

The stem 5 is more efficient when flat and is substantially of the same width as the inside of the sheath I in which it is slidable. It is of uniform width throughout the major portion of its length and tapers only near the end to which the ellipsoidal obturator tip 6 is affixed, the stem being of a width to just pass through the sheath. Stem 5 is of uniform thickness and is made of flexible material so that it can flex in accordance with the shape of the sheath and assist in withdrawing the filiform bougie. As there is a certain frictional slidable contact between stem 5 and the inside wall of the sheath I, this insures the ellipsoidal tip moving into proper position as it is inserted through the sheath at the open end thereof. The flat stem has been found to be a substantial improvement over a cylindrical stem for the reason that it insures the proper positioning of the tip and keeps the obturator in correct alignment so that it will not rock as the filiform bougie is withdrawn through the sheath. With the rounded end 30 of the sheath it obviates the danger of severing the filiform bougie in withdrawing same through the sheath. Stem 5 is slightly tapered at the forward end, as shown in Fig. 3. Stem 5 has a suitable ring or handle element 7. The shank of the stem is enlarged at 8 and provided with an annular shoulder 9 to abut against the shank or bead 10 of the sheath 1 when the obturator stem 5 is inserted in the sheath, as shown in Fig. 1.

In Fig. 9 a conventional sound 24 is shown, having a handle 26 and a conventional threaded end 25, and closed obturator 6.

I provide a conventional rubber catheter 11 of substantially the same diameter as the sheath in which it is slidable, to permit of its passage through the sheath 1. Catheter 11 has a rounded tip 14. The rubber catheter is provided with a suitable channel 12 extending substantially its entire length and terminating at its forward end in a lateral opening 13 to permit fluids to flow through the catheter.

The silver catheter which I have provided is shown in Fig. 9a and is designated 17. It has a channel extending through it, and near its curved operating end is a lateral opening 13a. Opening 13a is similar in function to the opening 13 of the rubber catheter 11.

As shown in Fig. 3, at the operating end of stem 5 I have devised a closed obturator tip 6 detachably secured on threaded portion 18. Beyond the enlarged threaded portion 18 is a smaller threaded end 19.

As shown in Fig. 5, I have devised a detachable ellipsoidal tip 20 which has a threaded channel 21 extending longitudinally partly through the tip, whereby the tip may be screw-threaded on the screw threaded portion 18 of stem 5. Channel 21 opens into unthreaded channel 27, which terminates at the other end of the tip. Channel 21 is of smaller diameter than unthreaded channel 27, as shown in Fig. 12. Closed obturator 6 and open obturator 20 are interchangeable on stem 5, (Fig. 3), on catheter (Fig. 9a), or sound (Fig. 9).

I provide a fine flexible solid rubber filiform bougie 22 having a slightly enlarged forward or operating end 23. Filiform bougie 22 becomes gradually larger toward its shank, which terminates in an interiorly threaded metal tube 23, covered by the rubber of the body of the filiform bougie. Tube 23 is of suitable size to have a threaded engagement with the novel threaded end 19 of the stem 5, as shown in Fig. 5.

As shown in Figs. 1a and 1, the open or operating end of sheath 1 is well rounded at 31 and rounded at its posterior portion 30. This rounded posterior end 30 of sheath 1 obviates danger of the filiform bougie being severed by the edge portion of the open end of the sheath and left in the patient as it is being withdrawn through the sheath.

Silver catheter 17, as shown in Fig. 9a may be provided with a conventional closed tip 6. Or alternatively, an open obturator tip 20 may be used on it, as the diameter of the screw threaded chamber 29 of closed obturator 6 is the same as the diameter of the threaded channel 21 of the open obturator tip 20, thereby making these members interchangeable.

If the physician is unable to catheterize the patient, the method left and of choice is the passing of the filament bougie with a screw shank. The flexible filiform bougie 22 is first inserted through the obstructed urethra into the bladder, which causes retention of urine. Then the physician attaches the silver catheter 11a and inserts it into the bladder, withdrawing the urine from the bladder. Then he withdraws the silver catheter from the urethra, leaving the filiform bougie 22 still in place. Then he applies successively graduated sizes of sounds to the filiform bougie 22 and passes each one separately into the bladder until the obstructed passage is dilated large enough; leaving the filiform bougie still in place in the urethra and bladder. The sounds may be used independently of the filiform, using either the closed obturator tip or the open obturator tip.

Then the physician takes the obturator 4 intact with the sheath 1, as shown in Fig. 14, and screws it on the filiform bougie, passing same into the bladder and then withdrawing the filiform through the sheath and leaving the silver catheter in place. Then he passes the soft rubber catheter 11 through the sheath 1, using the stilet or stem 5 with the closed obturator 6 to force the rubber catheter 11 into position in the bladder, and at the same time withdrawing the sheath 1 from the catheter, as illustrated in Fig. 7. This operation when completed leaves the soft rubber catheter 11 in place in the urethra and bladder to be retained for drainage of the bladder of the patient.

What I claim is:

1. In surgical instruments of the type described, the combination of a curved sheath, a flexible stem of substantially the same length as the sheath, said flexible stem having a handle member, the tip of the flexible stem having an enlarged threaded portion, and having a reduced threaded end extending beyond said enlarged threaded portion, an ellipsoidal longitudinally channeled and interiorly threaded tip adapted for threaded engagement on the enlarged threaded portion of the stem, said tip being of suitable size at its largest diameter to just pass through the sheath, a portion of the channel of said tip being unthreaded, and a flexible filiform bougie having its shank attachable to the aforesaid threaded end of the stem and adapted to be inserted through the sheath for operating in the urethra.

2. In surgical instruments of the type described, the combination of a curved sheath, a flexible stem of substantially the same length as the sheath, said flexible stem being flat and having a width of approximately the same dimensions as the inside diameter of the aforesaid sheath in which it is slidable, said flexible stem having a handle member, the tip of the flexible stem having an enlarged threaded portion, and having a reduced threaded end extending beyond said enlarged threaded portion, an ellipsoidal longitudinally channeled and interiorly threaded tip adapted for threaded engagement on the enlarged threaded portion of the stem, said tip being of suitable size at its largest diameter to just pass through the sheath, a portion of said tip being unthreaded, and a fine flexible solid filiform bougie having a shank attachable to the aforesaid threaded end of the stem and adapted to be inserted through the sheath for operating in the urethra.

3. In surgical instruments of the type described, the combination of a curved sheath, having handle members at the shank, a flexible stem of substantially the same length as the sheath, said flexible stem having a handle member, the tip of the flexible stem having an enlarged threaded portion, and having a reduced threaded end extending beyond said enlarged threaded portion, an ellipsoidal longitudinally channeled and interiorly threaded tip adapted for threaded engagement on the enlarged threaded portion of the stem, said tip being of suitable size at its largest diameter to just pass through the sheath, a portion of said tip being unthreaded, and a fine flexible solid filiform bougie having a shank attachable to the aforesaid threaded end of the stem and adapted to be inserted through the sheath for operating in the urethra.

4. In surgical instruments of the type described, the combination of a curved sheath having handle members at the shank, a flexible stem of substantially the same length as the sheath, and of substantially the same width as the inside diameter of the sheath, said flexible stem having a handle member, the tip of the flexible stem having an enlarged threaded portion, said member having a reduced threaded end, a detachable ellipsoidal tip longitudinally channeled and interiorly threaded through part of the channel for threaded engagement on the enlarged threaded portion of the stem, a portion of said channel being unthreaded, said tip being of suitable size at its largest diameter to just pass through the sheath, a fine flexible solid rubber filiform bougie attachable to the threaded end of the stem and seatable in the unthreaded portion of the tip and adapted to be inserted through the sheath for operating in the urethra.

5. In a surgical instrument of the type described, the combination of a sheath, a flexible stem, the stem having a large threaded end, and a threaded extension of smaller diameter on said end, a filiform bougie for operating in the urethra, said filiform bougie comprising a thin and slightly tapering cylindrical strand of solid rubber having a bead on its forward end and having an interiorly threaded metal tube contained within its shank and adapted for threaded engagement with the threaded extension of the flexible stem member, and a detachable ellipsoidal tip threaded to engage the large threaded end of the stem and to extend over the shank of the filiform bougie when the latter is screw threaded to the aforesaid stem.

6. In a surgical instrument of the type described, a curved sheath having the edge portion of its open end rounded along its posterior edge portion, an obturator insertable through the sheath, said obturator comprising a flat flexible stem of approximately the same width as the inside diameter of the sheath, a handle on said stem, a detachable longitudinally channeled ellipsoidal tip on said stem, a portion of the channel through the tip being threaded and the remaining portion being unthreaded, said unthreaded portion being of larger diameter than the threaded portion.

7. In a surgical instrument of the type described, a sheath curved at one end, handle elements at the other end of said sheath, the edge of the open curved end of the sheath having a rounded edge, the anterior portion being of the same thickness as the main portion of the sheath, an obturator insertable through the sheath, said obturator comprising a flat flexible stem of approximately the same width as the inside diameter of the sheath, a handle on said stem, a detachable longitudinally channeled ellipsoidal tip on said stem, a portion of the channel through the tip being threaded and the remaining portion being unthreaded, said unthreaded portion being of larger diameter than the threaded portion.

HARRY C. SCOTT.